Oct. 31, 1939.　　　　F. W. BURGER　　　　2,177,861
WHEEL BALANCING MEANS
Filed Nov. 16, 1936

Inventor
Frederick W. Burger
By Brown Jackson Boucher Denver
Attys

Patented Oct. 31, 1939

2,177,861

UNITED STATES PATENT OFFICE 2,177,861

WHEEL BALANCING MEANS

Frederick W. Burger, Niles, Mich., assignor to Clark Equipment Company, Buchanan, Mich., a corporation of Michigan Application November 16, 1936, Serial No. 111,073

2 Claims. (Cl. 301—5)

This invention relates to wheel balancing means, and more particularly is directed to the provision of means for balancing a wheel spider of the cast metal type in order to compensate for inequalities in weight due to variations in thickness produced during the casting of the spider.

It has been the practice, in a number of situations with which I am familiar, to balance a wheel structure by applying a balancing member or weight to the rim of an assembled wheel in order to compensate for eccentricities which result in an unequalized or non-uniform distribution of weight in the wheel or rim. However, so far as I am aware, such balancing means has always been employed in connection with an assembled construction, and has been applied to the demountable rim. As a matter of fact, the rim is usually so formed that its weight is substantially uniformly distributed, and the rim does not need to be balanced with respect to the wheel body. Further, the balancing of a completed assembly in this manner is not desirable due to the fact that when it is necessary to change the rim, a new balance must be set up when the new rim is applied.

I have found that the main cause of unequal distribution of weight is due to the fact that in casting a wheel body, the pattern may be distorted or the core may not be accurately positioned in such manner that the thickness of metal at one portion of the spider varies with respect to the thickness of metal at another portion of the spider, and consequently results in a non-uniform distribution of weight in the spider which, at high speeds, may produce an unbalanced centrifugal force that is undesirable and possesses numerous disadvantages.

While the forming of the wheel spider can be controlled to some extent, nevertheless such inequalities in distribution of weight do occur, and it is one object of the present invention to balance out such inequalities in order to make the wheel useful, even though it has not been formed in an accurate manner.

One of the main features of the present invention is to provide wheel balancing members which may be quickly and economically applied to a wheel after it has been determined that inequalities in the distribution of weight do exist, in order to compensate for such inequalities and provide a wheel which will run in true baance, and will not produce undue variations of centrifugal force when rotating at high speeds.

A further feature of the present invention is to so attach the wheel balancing member to the spider that it is concealed in position and is disposed in that portion of the spider which is not used, and thus does not interfere with the normal functions of the spider or with the application and removal of rims thereto.

Still another advantage secured by the present invention is the provision of a balancing member which is capable of being firmly secured to the wheel spider without any complicated or expensive operations, and which will remain in fixed position within the spider and will not become loose and rattle or cause any objectionable noises.

The present invention also contemplates means for balancing a wheel, which can be varied in accordance with the variation in unequally distributed weight present in the wheel, and thus will be capable of balancing any wheel regardless of the manner in which the weight is distributed and also regardless, within reasonable limits, of the amount of such variation.

Other objects and advantages of the present invention, such as the manner in which the balancing member can be attached to the wheel with facility, will become apparent from the following detailed description which, taken in conjunction with the accompanying drawing will serve to illustrate to those skilled in the art the particular construction and operation of a preferred form of the present invention.

Figure 1:
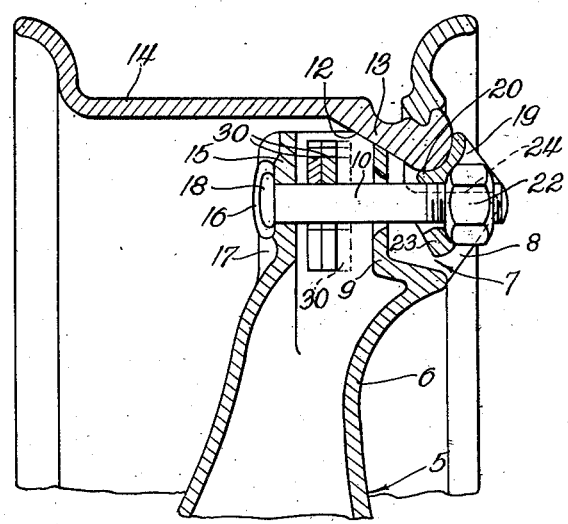
Figure 1 is a sectional view through a spoke end of a cast metal wheel with a demountable rim secured thereto and illustrating the manner in which the balancing means is mounted with respect to the wheel spider.

Referring now in detail to the drawing, the wheel spider consists of a cast metal member indicated generally at 5, having the hollow radially extending spokes 6 which terminate at their outer extremities in laterally opening sockets 7 defined by spaced radially extending side walls 8.

Each of the sockets 7 terminates at its inner end in a radially extending transverse wall 9, which is apertured to receive a clamping bolt 10 extending therethrough. At its outer end the spoke 6 is provided with the tapered surface 12 adapted to receive the beveled edge portion 13 of a tire rim 14 to form a rim receiving seat for demountably positioning the rim on the spider 5.

The spoke end is also provided with a rear radially extending wall 15 having a thickened boss portion forming a stop for the head end 16 of the bolt 10, and being provided with axially extending rims 17 on opposite sides thereof which cooperate with the flattened surfaces 18 of the bolt head to prevent the same from turning with respect to the spoke end.

The bolt 10 is threaded at its outer extremity which projects through the socket 7, and is adapted to receive the clamping lug 19 having the lip portion 20 engaging the outer marginal edge of the beveled portion 13 of the rim for forcing the same axially inwardly with respect to the wheel body 5 when the nut 22 is tightened with respect to the bolt 10. The lug 19 is provided with a shank portion 23 apertured to receive the bolt, and with spaced lateral seating portions adapted to engage the axially extending spaced shoulders 24 terminating at the outer end of the side walls 8 which form the socket 7. This socket is preferably U-shaped, and the shank 23 extends into the socket and has free movement axially therein along the bolt 10, the lug 19 being supported by engagement with the shoulders 24.

It will thus be seen that when the rim has been initially placed upon the rim seat 12 and the lug then applied to the bolt 10, tightening of the nut 22 will force the lug 19 inwardly along the shoulders 24 wedging the rim 14 firmly on the seat 12 into fixed position on the outer ends of the spokes 6.

Assume now that prior to the mounting of the rim on the wheel body 5, the wheel body has been tested and found to have non-uniform distribution of weight that requires the addition of a predetermined amount of metal to the portion of the spider indicated by the spoke 6. The effectiveness of this metal increases proportionately to the distance at which the metal is added with respect to the center of the wheel due to the fact that its moment arm increases with its radial distance from the center of rotation. It is thus apparent that a small additional amount of weight at the outer extremity of the spoke 6 will be more effective in balancing the wheel body 5 than the same amount of metal disposed adjacent the hub of the wheel. The present invention therefore contemplates that the balancing means be applied at or adjacent the outer extremity of the spoke to which such additional weight must be added in order to balance the wheel.

Considering now in detail the particular balancing member employed in the present invention, this member is indicated generally at 30 and comprises a metal stamping or the like, having the two extending leg portions 32 defining therebetween a slot 33 terminating at its inner edge in the arcuate portion 34, which is of a radius substantially equal to the radius of the bolt 10. The portion of the slot 33 which extends from the arcuate portion outwardly to the tips of the leg 32 is defined by parallel spaced side wall portions 35, which are spaced apart a distance substantially equal to the diameter of the bolt 10.

Figure 3:
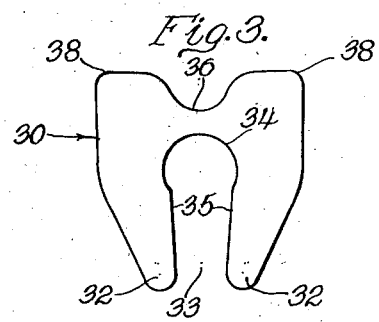
Figure 3 is a front elevational view of the attaching member showing the manner in which it is clamped to the wheel.

At the edge of the member 30 opposite to the edge in which the slot 33 is formed, there is provided a centrally recessed portion 36 which extends inwardly substantially in line with the slot 33, and which has diverging defining edge portions 37 terminating in shoulders 38 formed at the upper corners of the member 30. It will thus be apparent that the member 30 has a reduced portion or web 39 separating the recess 36 and the slot 33. This reduced web is of such cross section that the application of force to the corners 38 of the member 30 will result in bending of the leg portions 32 of the member 30 inwardly toward each other as shown in Figure 3.

To mount the member 30 on the bolt 10, the member is initially placed over the bolt with the leg portions 32 extending radially inwardly toward the hub of the wheel body 5, and with the arcuate recess 34 receiving the upper periphery of the bolt 10. The member 30 is preferably disposed between the walls 9 and 15 at the extremity of the spoke 6 where it is out of the way and does not interfere in any manner with the mounting or demounting of the rim 14 on the end of the spokes. After the member 30 has been placed in position, a suitably forked tool is placed on the two shoulders 38 and is struck by a hammer or the like to impart a downward force at these two points. The reaction of this force is taken by the web portion 39 supported by the bolt 10 and, as a result, the opposite sides of the member 30 below the bolt 10 are forced inwardly as shown in Figure 3, thereby reducing the area of the opening formed by the recess 34 and the side walls 35 so that the defining edge of the slot 33 is forced into tight gripping engagement with the annular periphery of the bolt 10, and frictionally clamps the member 30 to the bolt in fixed position to hold the same against rattling or movement longitudinally of the bolt.

In Figure 1 I have shown two such members 30 applied to the bolt 10, and have indicated in dotted lines that a third member may be so applied. The number of such balancing members 30 which are secured to any clamping bolt in this manner is determined, of course, by the amount of weight necessary at any particular point in order to produce a balanced wheel body. In some instances only a single member need be applied, but by reason of the present construction, any required number may be applied to the clamping bolt in this manner.

This produces an additional amount of metal firmly fixed to the wheel body at the desired point to counteract an unequal distribution of weight in the wheel body, and to thus provide a balanced wheel construction.

Figure 5:
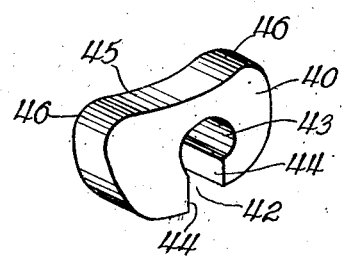
Figure 5 is a perspective view of a modified form of balancing member.

In Figure 5, I have disclosed a modified form of balancing member, indicated generally at 40, which possesses the same features as the member 30 but is substantially heavier, being of the order of twice the weight of the member 30 so that, if desired, instead of applying two members corresponding to the member 30 a single member such as the member 40 may be applied. In practice I find that the member 30 should, under certain conditions, be of a weight approximating one ounce, and that the member 40 may be two ounces in weight if so desired. It is to be understood, of course, that the weights of these members preferably are determined by the size of wheel to which they are to be applied, and to the range of variation of unequally distributed weight which may be encountered within the safety limits of the wheel body.

Figure 4:
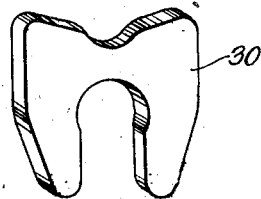
Figure 4 is a perspective view of the balancing member shown in Figure 2.

The member 40 is of considerably greater thickness than the member 30 as can be observed from an inspection of Figures 4 and 5. The member 40 has a central inwardly extending recess 42 defined at its inner end by the arcuate wall 43 and at its outer end by the spaced parallel walls 44.

Figure 2:
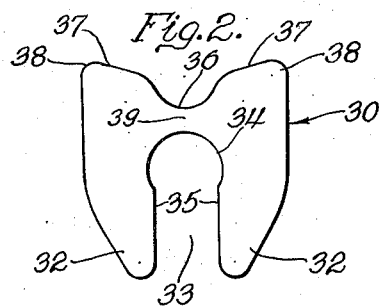
Figure 2 is a front elevational view of a balancing member prior to its application to the spider.

The upper end of the member 40 is concave in shape, as indicated at 45, and is provided with corner portions 46 adapted to be engaged by a suitable tool for impacting the same to clamp the member 40 about the bolt which extends through the arcuate portion 43 of the slot 42. The member 40 is applied to the bolt in the same manner as described in connection with the members shown in Figures 2, 3 and 4.

It is to be understood that the balance member may be of any desired configuration that will fit within the outer open end of the spoke, and which will engage about the bolt 10 and be capable of being rigidly secured thereto in a simple manner such as by a hammer blow or the like. I do not intend to limit the present invention to wheel balancing means of the exact type and design herein illustrated and described, but intend to be limited only as defined by the scope and spirit of the appended claims.

I claim:

1. In combination, a cast metal wheel having radially extending hollow spokes open at their outer ends, bolts extending transversely across the spokes adjacent their outer ends, and a wheel balancing member having a relatively deep slot in one edge thereof and having shoulders on its opposite edge spaced on opposite sides of the slot, whereby said member can be inserted through the open end of a spoke with said slot receiving the clamping bolt and said shoulders can then be impacted to deform said slot for frictionally clamping said member to said bolt.

2. In combination, a wheel body having hollow spokes, each of said spokes terminating at its extremity in a pair of spaced transverse walls, a bolt extending through and supported by said walls, and a balancing member having a relatively deep slot for receiving said bolt in one edge and an alined shallow slot in the opposite edge, the defining portions of the extremities of said shallow slot constituting ears, a deformable web portion separating said slots, said balancing member being adapted to be clamped to said bolt intermediate said walls by impact on said ears deforming said web portion to close the outer end of said deep slot, said member being of a size such that it is disposed entirely within the end of said spoke and out of contact therewith.

FREDERICK W. BURGER.